United States Patent [19]

Henderson

[11] 4,405,575

[45] Sep. 20, 1983

[54] METHOD OF DEFLUORINATING PHOSPHATES

[76] Inventor: Albert E. Henderson, 10126 Leisure La. North, Jacksonville, Fla. 32216

[21] Appl. No.: 371,333

[22] Filed: Apr. 23, 1982

[51] Int. Cl.$^3$ .............................. C01F 1/00; C01F 5/00; C01B 25/16; C05B 11/04
[52] U.S. Cl. ................................... 423/167; 423/319; 423/320; 423/484; 71/37; 71/DIG. 3
[58] Field of Search ............... 423/167, 320, 483, 484; 71/DIG. 3, 37, 41; 423/319

[56] References Cited

U.S. PATENT DOCUMENTS

| | | | |
|---|---|---|---|
| Re. 19,045 | 1/1934 | Larsson | 23/165 |
| 1,329,273 | 1/1920 | Ross | 423/321 |
| 1,459,124 | 6/1923 | Webster . | |
| 1,538,089 | 5/1925 | Carothers et al. | 423/321 |
| 1,747,588 | 2/1930 | Lohmann . | |
| 1,776,595 | 9/1930 | Nordengren | 423/320 |
| 1,851,179 | 3/1932 | Hechenbleikner | 423/320 |
| 1,972,196 | 9/1934 | Larison | 23/109 |
| 2,002,547 | 5/1935 | Nordengren | 23/165 |
| 2,015,384 | 9/1935 | Nordengren | 71/7 |
| 2,072,980 | 3/1937 | Curtis | 23/109 |
| 2,173,826 | 9/1939 | Curtis | 23/108 |
| 2,287,759 | 6/1942 | Hardesty et al. | 71/40 |
| 2,360,197 | 10/1944 | Butt | 99/2 |
| 2,414,700 | 1/1947 | Shoeld | 71/40 |
| 2,414,701 | 1/1947 | Shoeld | 71/40 |
| 2,442,969 | 6/1948 | Butt | 99/2 |
| 2,448,126 | 8/1948 | Shoeld | 71/40 |
| 2,504,544 | 4/1950 | Legal et al. | 23/165 |
| 2,504,546 | 4/1850 | Wight et al. | 71/40 |
| 2,598,658 | 5/1952 | Procter et al. | 71/37 |
| 2,643,948 | 6/1953 | Sordet | 71/46 |
| 2,673,795 | 3/1954 | Hudson | 71/39 |
| 2,759,795 | 8/1956 | Archer | 23/109 |
| 2,799,557 | 7/1957 | Seyfried et al. | 23/109 |
| 2,807,521 | 9/1957 | Lambe et al. | 23/165 |
| 2,885,263 | 5/1959 | Piet | 23/165 |
| 2,889,200 | 6/1959 | Baron | 23/109 |
| 2,890,936 | 6/1959 | Benefield | 23/165 |
| 2,895,799 | 7/1959 | Baron et al. | 23/109 |
| 2,898,207 | 8/1959 | Schilling et al. | 71/37 |
| 2,933,372 | 4/1960 | Manning | 23/165 |
| 2,962,357 | 11/1960 | Williams et al. | 23/165 |
| 3,034,863 | 5/1962 | Johnson et al. | 23/206 |
| 3,034,883 | 5/1962 | Hignett et al. | 71/37 |
| 3,074,780 | 1/1963 | Smalter | 23/165 |
| 3,102,000 | 8/1963 | Malley et al. | 23/108 |
| 3,107,145 | 10/1963 | Hinkle et al. | 23/108 |
| 3,142,534 | 7/1964 | Nickerson | 71/DIG. 3 |
| 3,142,534 | 7/1964 | Nickerson | 23/108 |
| 3,151,937 | 10/1964 | Nickerson | 23/108 |
| 3,151,937 | 10/1964 | Nickerson | 23/108 |
| 3,151,938 | 10/1964 | Seidman | 23/109 |
| 3,193,351 | 7/1965 | Miller et al. | 23/165 |
| 3,212,874 | 10/1965 | Baumenn | 71/34 |
| 3,376,124 | 4/1968 | Hollingsworth | 71/39 |
| 3,389,959 | 6/1968 | Lee | 23/109 |
| 3,394,987 | 7/1968 | Lee | 23/109 |
| 3,397,123 | 8/1968 | Coll | 203/49 |
| 3,425,837 | 2/1969 | Conte et al. | 99/2 |
| 3,429,663 | 2/1969 | Shearon et al. | 23/165 |
| 3,519,387 | 7/1970 | Henderson | 423/320 |
| 3,544,269 | 12/1970 | Rushton | 23/165 |
| 3,556,724 | 1/1971 | Fuchs et al. | 23/165 |
| 3,615,195 | 10/1971 | Bierman et al. | 23/165 |
| 3,672,828 | 12/1972 | Henderson | 23/109 |
| 3,840,639 | 10/1974 | Drechsel | 423/167 |
| 3,943,232 | 3/1976 | Case | 423/317 |
| 4,026,995 | 5/1977 | Case | 473/321 R |
| 4,029,743 | 6/1977 | Hauge | 423/320 |
| 4,101,637 | 7/1978 | Bierman et al. | 423/309 |
| 4,101,647 | 7/1978 | Clauss et al. | 424/5 |
| 4,154,799 | 5/1979 | Hauge | 423/158 |

FOREIGN PATENT DOCUMENTS 842881 12/1976 Belgium .

OTHER PUBLICATIONS

TVA Patents Mar. 1982.
U.S. Fertilizer Technology Patents
Superphosphate: Its History Chemistry, and Manufacture, Dec. 1964.
Blake and Nash "Increasing Fluosilicic Acid Evolution from Phosphate Rock Digestion with Phosphoric Acid", United States Department of the Interior Report of Investigations 7980, pp. 1–6.
"Granular Normal Superphosphate from Strong Sulfuric Acid", Developments in Technology of Fertilizer Production, TVA Division of Chemical Development 4th Demonstration, pp. 40–41, (Aug. 7–8, 1962).

*Primary Examiner*—Gregory A. Heller
*Attorney, Agent, or Firm*—Ladas & Parry

[57] ABSTRACT

This invention comprises a method for removing fluorine from natural phosphates, superphosphate materials and wet process phosphoric acids starting materials comprising
- (a) admixing rock phosphate having a fluorine content above that desired with an acid mixture within the range of rock:acid mixture of about 0.8 to 1 and 1:1.4 by weight;
- (b) said acid mixture being substantially concentrated phosphoric acid and concentrated sulfuric acid in a range of phosphoric:sulfuric of about 1:1 to 5:1 by weight;
- (c) said admixing being at a temperature in the range of 215° to 265° F. while adding water in an amount of up to about 12% by weight of the total mixture and then subjecting the above charge;
- (d) in a first heating stage adding (1) recycle in an amount substantially of recycle to charge of 1:1 to 10:1 by weight (2) and water while heating to a temperature in the range of 300° F. to 400° F. for a period of time up to about 6 minutes;
- (e) and in a second heating stage, maintaining the temperature in the range of 400° to 600° F. for a period of time of up to about 6 mimutes, and then;
- (f) quickly cooling the resulting product above to a temperature range below about 300° F. to 200° F. while neutralizing to about 1 to 6% free acid and with addition of at least sufficient amount of water to have water of hydration of substantially 2 to 9% by weight in the final product;
- (g) and, crushing the above resulting product to a desired granular size and separating and returning smaller fine particles as recycle.

7 Claims, 1 Drawing Figure

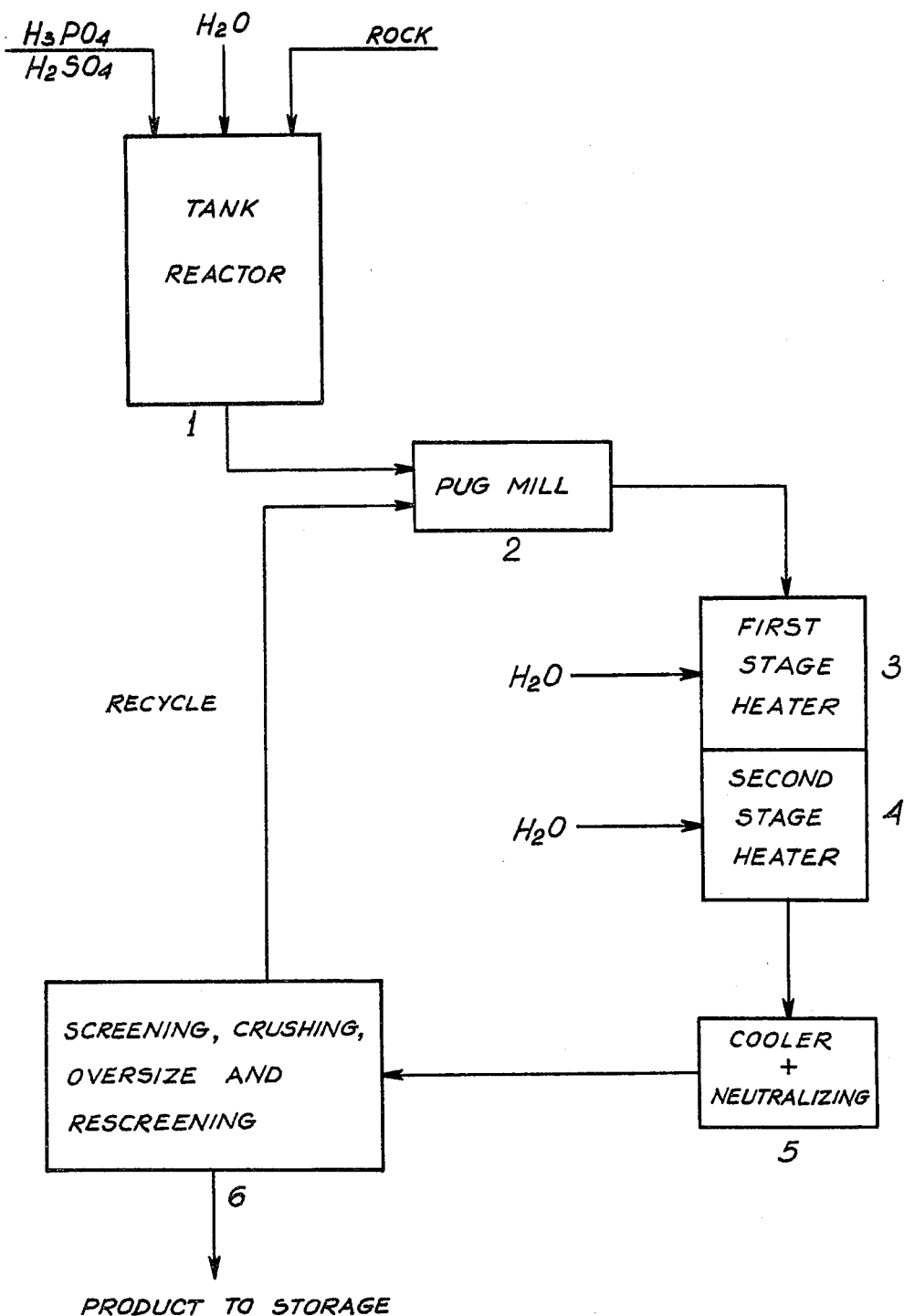
FLOW CHART

METHOD OF DEFLUORINATING PHOSPHATES

This invention relates to a method of defluorinating natural and manufactured phosphates by chemically liberating gaseous fluorides from reaction mixtures. More specifically, it relates to the production of defluorinated phosphatic compounds, which can be used as phosphatic feed supplements providing the essential nutrients of phosphorus, calcium, and sulphur. More specifically, this is a method for conversion of phosphate rock (generally fluoapatite in composition) to either monocalcium phosphate or dicalcium phosphate or a combination of these compounds in the presence of lesser quantities of hydroxyapatite, tricalcium phosphate, phosphoric acid and cation impurities of phosphate rock.

Phosphatic feed supplements are generally produced by the following processes:

(1) Reacting CaO, Ca(OH)$_2$ or CaCO$_3$ with furnace grade phosphoric acid (usually 54% P$_2$O$_5$) and producing a product containing 18% P to 21% P and less than 0.1% fluorine (F).

(2) Reacting CaO, Ca(OH)$_2$ or CaCO$_3$ with Purified wet process phosphoric acid (usually 54% P$_2$O$_5$ containing less than 0.2% F). These products generally contain 18% P to 21% P and about 0.20% F.

Both products are included under the broad label of "Dicalcium Phosphate" although they usually contain other phosphate compounds such as monocalcium phosphate. Products produced from wet process acids contain various amounts (3–10%) of iron, aluminum, and other impurities.

(3) Defluorinated phosphates have been produced in the past thermally by heating phosphate rock (usually above 1500° C.) in the presence of additives and water in rotary kilns or other furnaces to drive off fluorine and form high temperature tricalcium phosphates.

These products have frequently contained low biologically available phosphorus, although the fluorine content was usually sufficiently low to qualify as a phosphatic feed supplement. Most of the products produced today, due to improvements in control technology and process conditions are sufficiently low in fluorine and have a high degree of biological phosphate availability. An example of a satisfactory process is described by Williams, U.S. Pat. No. 2,997,367. These products contain between 16% and 21% phosphorus and approximately 0.2% F.

(4) Various natural products such as phosphate rock low in fluorine, steamed bone meal, meat and bone meal, fish meal, etc., also contribute significant tonnages of satisfactory phosphatic feed supplements. Curacao rock, from the island of Curacao, has been a significant source of low fluorine natural phosphate rock for years; however, due to exhaustion of quality deposits, this source will probably withdraw from the market in the near future. These products varied from 16% P-0.4% F, 14% P-0.5% F, and finally 13% P-0.75% F.

Van Wazer, Phosphates and Its Compounds, Vol. 11, Section 15, pages 995–997, 1961 provides an informative discussion of the above supplements, also section 24, pages 1597–1600.

Waggaman, Phosphoric Acid, Phosphate and Phosphatic Fertilizer, Reinhold Publishing Corp., N.Y., U.S.A., 1952, pages 356–406, discusses the merits of phosphatic supplement which have been used in the U.S. and Europe. He describes a process for defluorinating Superphosphates (a phosphatic fertilizer) for use as a phosphatic feed supplement. This came about early in World War II when there was a shortage of bone meal in the United States. These products were produced by thermally defluorinating Superphosphates at temperatures of 600° to 1200° C. Some patents teaching this technology are:

Wight and Anderson, U.S. Pat. No. 2,234,511 (May 11, 1941). Shoeld, U.S. Pat. No. 2,288,112 (June 30, 1944). Butl, U.S. Pat. No. 2,360,197 (Oct. 10, 1944). During World War II there were at least four plants producing these products; however, they were phased out after World War II because of low product phosphorus availability.

(5) There are a number of European processes producing dicalcium phosphate type products by nitric acid and hydrochloric acid acidulation of phosphate rock and subsequent processing. At least several European processes also produce feed grade phosphatic supplements as by-products from fertilizer production.

Natural phosphates which contain sufficient quantities of biologically available phosphorus of low fluorine content are in short supply because of world demand for these products; accordingly, it has behooved the industry to produce phosphatic supplements from materials which are adequately available. Furnace grade phosphoric acid was once considered a logical material to satisfy this need, but is now too costly and is in limited supply. Production of this material requires very large amounts of expensive energy, high capital costs and excessive maintenance. All of these factors were a problem even in the early Nineteen Hundred and Seventies when John Douglas* of the Tennessee Valley Authority reported the large cost difference between furnace grade phosphoric acid and wet process acid at $54.34 per ton of 54% P$_2$O$_5$ acid. This condition has continued to escalate to the point where high cost furnace grade phosphoric acid is no longer used in the production of phosphatic feed supplements.
*1970 EASTERN FERTILIZER CONFERENCE, ATLANTA, GEORGIA, Oct. 14–16, 1970.

Defluorinated phosphate rock and the various monocalcium and dicalcium phosphates supply approximately 75% of the world phosphatic feed supplements. All of the phosphorus from these phosphates is derived from purified wet process phosphoric acid. Dicalcium phosphate processes generally require large investment, high maintenance, and significant energy requirements. Defluorinated phosphate rock processes use a greater amount of relatively cheap phosphate rock to produce quality grade phosphatic feed supplements; however, capital costs are high compared to dicalcium phosphate processes and energy requirements are very high, variously estimated at about eighty (80) gallons of Bunker "C" fuel per ton of product produced.

Because this invention relates to defluorination of "Superphosphate" type products the following discussion of Superphosphates should be helpful in understanding its similarities and differences.

"Superphosphates" have for many years been the dominant phosphatic raw material for the fertilizer industry. These phosphate products are normally produced by reacting finely ground phosphate rock with sulfuric and phosphoric acids. These acids convert the highly insoluble rock to chiefly monocalcium phosphate which is readily available to plants.

Although Superphosphates have many names, the most common is NORMAL or SINGLE Superphosphate, containing 18% to 20% $P_2O_5$ and produced by reacting sulfuric acid with phosphate rock; TRIPLE or CONCENTRATED Superphosphate (40% to 52% $P_2O_5$) is made by reacting phosphoric acid with phosphate rock; ENRICHED Superphosphate (27%–40% $P_2O_5$) is produced when the acidulent is a mixture of sulfuric and phosphoric acids.

Phosphate rock contains significant amounts of impurities, such as iron, aluminum and fluorine. Although the fluorine content varies from about 0.2% to 7–8%, most of the world's more useful deposits contain about 2 to 5% F. Florida rock, one of the world's largest sources, contains about 3.0 to 4.2% fluorine.

When Superphosphates are produced by conventional processes, about 10% to 30% of the fluorine is evolved as HF and $SiF_4$ gases and a typical Triple Superphosphate contains about 2.5% fluorine. Even though Superphosphates consist principally of desirable monocalcium phosphate, their fluorine contents are much too high to qualify these products as phosphatic feed supplements.

The low biological availability of phosphate produced by calcining Superphosphate has been discussed above.

Some of the various parameters which relate to fluorine evolution during the manufacture of Superphosphate include the following:

1. Type of phosphate rock: various phosphate rocks differ significantly in chemical composition.
2. Concentration of reactant acids.
3. Temperature of reactant acids.
4. Mixing technique.
5. Mixing cycle.
6. Rock particle size.
7. Degree of acidulation (rock to acid ratio for any specific rock).
8. Type of additives.
9. Curing procedures.
10. Other specific items not generally considered.

A very informative discussion of the above parameters is "Superphosphate": Its historyl, chemistry and manufacture, U.S.D.A., and Tennessee Valley Authority, issued December 1964 by the "U.S. Department of Agriculture", particularly pages 165-181 and pages 217-239.

Henderson, U.S. Pat. No. 3,519,387, July 7, 1970, teaches techniques for producing Superphosphate of relatively low fluorine content; however, his chief aim was to stop fluorine evolution from Superphosphate in large storage buildings. He also generally discusses the parameters mentioned in the above reference. This patent is significant because, in view of the substantial literature relating to fluorine evolution, this was a significant effort which demonstrated that fluorine evolution could be substantial by a chemical process even if the fluorine values were not sufficiently low to warrant consideration as a phosphatic feed supplement.

Escalating cost factors including high energy considerations have created a need for a process to produce satisfactory phosphatic feed supplements. The reduction in the use of furnace grade phosphoric acid started before 1970. In addition, the world market is faced with limited quantities of suitable natural phosphatic products for this purpose. Defluorinated phosphate, though an acceptable product, has the serious disadvantage of requiring an enormous quantity of fuel for production, as well as other escalating cost factors. Dicalcium phosphates generally derive all of their phosphate content from expensive purified wet process phosphoric acid and, in addition, require significant quantities of fuel and electrical energy for processing.

I have developed a process for producing quality phosphate feed supplements which require significantly less total energy and capital investment and which derive substantial amounts of phosphate from abundant and inexpensive phosphate rock.

The process of this invention makes possible the defluorination of phosphate rock and merchant grade wet process phosphoric acid by reacting these and other materials, together with varying amounts of sulfuric acid, under rigid conditions. The products of this invention are substantially lower in fluorine than any other products which result from processes which chemically break down the rock (fluorapatite) lattice to liberate fluorine gases and form biologically available phosphorus compounds.

The practice of my invention was applied to Florida phosphate rock by making various acidulations with merchant grade wet process phosphoric acid, sulfuric acid and mixtures of these acids.

Because of the complex chemical composition of phosphate rock, various methods have been used to estimate the acid requirements for acidulating this material. I have used the following general procedure for estimating acid requirements followed by actual analysis for adjusting formulations.

REACTION OF PHOSPHATE ROCK WITH PHOSPHORIC ACID (1006)                (1372)              (A)
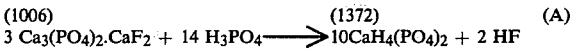

Thus ten (10) moles of CaO from rock react with fourteen (14) moles of phosphoric acid to produce ten (10) moles of $CaH_4(PO_4)_2$ and liberate two (2) moles of gaseous HF. Accordingly, one gram of rock CaO requires 1372/560.8 grams of $H_3PO_4$ to convert all of the rock calcium and phoshorus to monocalcium phosphate which is defined as 100% acidulation.

This is equivalent to 2.4465 grams of $H_3PO_4$ per gram of CaO. Since the above product is manufactured from a mixture of phosphoric acid and sulfuric acid, then the following chemical equation is required for the portion of the rock which must be reacted with sulfuric acid ($H_2SO_4$).

REACTION OF PHOSPHATE ROCK WITH SULFURIC ACID (b)     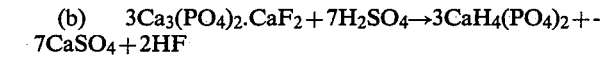

Accordingly, ten (10) moles of CaO from rock react with seven (7) moles of sulfuric acid to produce three (3) moles of monocalcium phosphate $CaH_4(PO_4)_2$ and liberate two moles of gaseous fluorine. Thus, one (1) gram of rock CaO requires 686/560.8 grams of $H_2SO_4$ or 1.223 grams of $H_2SO_4$ per one (1) gram of rock CaO to convert all of the rock CaO to monocalcium phosphate and thus represent 100% acidulation. Based on this chemistry, 100 grams of rock (containing 49.19% CaO) requires 50 grams of $H_3PO_4$ (75%) and 43.6 grams of $H_2SO_4$ (95%) for conversion. The formula then should be 100 grams of rock, 50 grams of 75% $H_3PO_4$ and 43.6 grams of 95% $H_2SO_4$.

The above reactions have been written with no consideration given to the significant amounts of acid consuming cationic impurities present in phosphate rock. In addition, liberated gaseous fluorides (HF, and, others) are highly reactive and tend to react with compounds of calcium, phosphorus, silicon, and other impurities present in wet process phosphoric acid and rock phosphate to form stable compounds which are not liberated from the reaction mix under normal conditions.

DETAILED DESCRIPTION OF THE INVENTION

In accordance with this invention there is provided a method for removing fluorine from natural phosphates, superphosphate materials and wet process phosphoric acids starting materials comprising (a) admixing rock phosphate having a fluorine content above that desired with an acid mixture within the range of rock:acid mixture of about 0.8 to 1 and 1:1.4 by weight;

(b) said acid mixture being substantially concentrated phosphoric acid and concentrated sulfuric acid in a range of phosphoric:sulfuric of about 1:1 to 5:1 by weight;

(c) said admixing being at a temperature in the range of 215° to 265° F. while adding water in an amount of up to about 20% by weight of the total mixture and then subjecting the above charge;

(d) in a first heating stage adding (1) recycle in an amount substantially of recycle to charge of 1:1 to 10:1 by weight (2) and water while heating to a temperature in the range of 300° F. to 400° F. for a period of time up to about 6 minutes;

(e) and in a second heating stage, maintaining the temperature in the range of 400° to 600° F. for a period of time of up to about 6 minutes, and then;

(f) quickly cooling the resulting product above to a temperature range below about 300° to 200° F. while neutralizing to about 1 to 6% free acid and with addition of at least sufficient amount of water to have water of hydration of substantially 3 to 9% by weight in the final product;

(g) and, crushing the above resulting product to a desired granular size and separating and returning smaller fine particles as recycle.

I should like to discuss the details of my process as follows:

DESCRIPTION OF THE FLOW DIAGRAM

The present preferred process is set forth schematically in the attached flow diagram.

The use of a standard type TANK REACTOR (1) (frequently used in the triple Superphosphate industry) permitted a better conversion of rock phosphate to available forms and made this possible without heating the phosphoric or sulfuric acids in the 250° to 325° F. range as was required in previous procedures. Ambient temperatures only are required for the acid temperatures.

The neutral ammonium citrate insoluble content of the reactor mix usually contains less than about 0.25% insoluble $P_2O_5$ and the water solubility at the 95%+$P_2O_5$ level. While the fluorine removal is significantly less with the tank mixer than a pug mill operation, for which experiments were tried, this does not present a problem since the chemical and physical characteristics of the tank reactor discharge makes possible greater fluorine removal in the heater phase of the operation. Generally about 10% to 30% of fluorine is evolved in the tank reactor step versus about 25 to 50% fluorine removal using a pug mill unit initially.

When the reactor composition is in the 95 to 100% water solubility range with weight loss of 20 to 24% at 103° C. (four hours) and 29 to 33% (1.5 hours) at 245° C. with a neutral ammonium citrate insoluble content of less than about 0.25% then a fluorine content of 1.5% can be reduced to the 0.15%–0.20% range without difficulty. The fluorine content of the tank reactor discharge is in the 0.50 to 1.50% range.

An initial charge is represented by the following formula:

100 Rock (31.5% $P_2O_5$-47.5% CaO-3.2% F) 100 $H_3PO_4$ (54.0% $P_2O_5$-0.4% F) 34.5 $H_2SO_4$ (93%) These materials were fed continuously to the tank mixer (1) along with sufficient $H_2O$ to maintain a discharge free $H_2O$ content of 16–32% at a temperature of 180°–265° F. but preferably about 220°–240° F.

The retention time in this tank mixer is up to about 10 minutes. If rock grind is less than 95%—325 mesh such as about 75% minus 325 mesh then more retention time is required in the tank reactor in order to convert all of the rock $P_2O_5$ to about 0.25% citrate insoluable $P_2O_5$ or less (about 6 minutes).

The mixer preferably discharges a slurry to a short pug mill (2) for the purpose of mixing recycle with the tank mixer slurry—about 5% of $H_2O$ was added here to insure good mixing of recycle and charge: however water addition, if made, is controlled so that mixture did not become wet enough to cause large agglomerates.

The retention in the pug mill is preferably about 1 to 2 minutes and the product then discharged to the 1st (preferably CO-Current) heater stage or area (3) where the material is heated to about 300° to 400° F. and preferably about 350°–380° F. (retention time up to about 6 minutes).

Heater stage or area number one discharges product to heater stage or area number 2 (4) (which is preferably counter-current) where the product is heated to about 400° to 600° F. and preferably to about 420° to 500° F. (Retention time heater area to stage number 2 (4) is up to about 6 minutes).

Heater stage or area #2 (4) discharges to a cooler (5), which is preferably a rotary cooler, where it is immediately quenched with water to drop the temperature below about 300° to 200° F. Air then dropped the temperature to about 175° to 125° F. Retention time in cooler (5) is preferably about 4 to 6 minutes. Various neutralizing agents such as NaOH, CaO, Ca(OH)$_2$, Na$_2$CO$_3$ and other alkaline materials may be added with the quench water to reduce the free phosphoric acid content of product to about 1–6% $H_3PO_4$, preferably about 3% $H_3PO_4$.

The material discharged from the cooler is then crushed and screened (6). Fines are returned to the pug mixer (2) as recycle product may also return to pug mill when insufficient fines are produced to satisfy recycle requirements which may vary from about 1 to 1 to about 10 to 1. Product is conveyed to storage.

Acids Used

I have used $H_2SO_4$ in the 93% range in most of the pilot plant work because that concentration is readily available—my preference is 96–98% and I have used 93%, 95–96%, and 98%.

I have used phosphoric acid in the 48 to 60% range (as $P_2O_5$)—most of the acid (wet process) has varied in the 52–55% range which is merchant grade acid (most common commercial grade).

I now describe the tank and its operation as actually used in the experiments.

Tank

The Tank is 12" (inside diameter) with a liquid level of 10"–12" and an overall height of 20 inches. Acids were metered separately about an inch from the paddle shaft which was operated about 120 R.P.M's and contains blades which create turbulent mixing action. Water and rock were introduced in the same immediate area as the acids. The amount of water varied with formulation at about 18 to 28 lbs per hour or about 8 to 12% of the formula charge. The tank slurry was regulated by addition of water, some variation in steam addition—about 12 to 25 lbs. of steam per hour or 150 lbs. of product or about 1 lb. of steam per 8–10 lbs. of product. Water was the major control factor in preventing the slurry discharge from setting up prior to discharge.

I could operate without steam; however, it does provide a means of control which is helpful. One very important factor with the tank mixer is retention time, for example a 2.5 minute retention time with standard superphosphate rock grind results in a citrate insoluble $P_2O_5$ of 1.75–2.2% whereas a retention time of six minutes reduces the citrate insoluble to about 0.60% to 1.0%.

Phosphate Rock Used

The phosphate rocks that I have used have varied between 28%–34% $P_2O_5$ with most in the 30–32 range with CaO content of about 43 to 50% and fluorine from 3.0% to 3.84%.

Standard phosphate rock grind can preferably be used and this consists of a rock grind of about 70 to 75%, mostly about 73%, minus 200 mesh (U.S. Standard).

Admixing Procedure

Finely ground phosphate rock (100% Minus 200 Mesh) is preferred when the first admixing is in a mixer of the pug mill type. In the present preferred system a tank reactor is used which discharges to a pug mill (for mixing slurry discharge with recycle only) and then to the first and second stage heating cycle and then on to the cooling and neutralization operation and finally to the screening and crushing.

In the procedure of the instant invention I have found it very useful to use a tank-type reactor for the initial admixing operation. The tank-type reactor provides preferably up to 10 minutes retention time at temperature of 210° to 265° F. (preferably 225°–250° F.). Water is added in the tank mixer in order to prevent early set-up of the charge during the retention time and a more fluid reaction medium (caused by $H_2O$ addition). This permits the necessary conversion reactions to take place faster in the tank mixer than in a pug mill or similar mixer, more importantly, the tank reactor permits a coarser rock grind (actually standard rock grind for the Superphosphate industry of about 70 to 75% minus 200 mesh) can be used. The tank type reactor conditions eliminate the need for high temperatures and for the pre-heating of the acids.

Water Additions

The total amount of water required in the tank mixer varies with the particular rock and fineness of grind. For most Florida rocks an amount of water of about 10 to 12% of the total charge is sufficient with a standard Superphosphate grind. The amount of water added in the tank mixer also varies with the concentration of the phosphoric acid since this is the chief contributor to water content of the charge. For example, when the formula is

---

100 lbs. rock × 1.0% $H_2O$ = 1.0 lb. $H_2O$
100 lbs. 75% $H_3PO_4$ × 24% $H_2O$ = 24 lb. $H_2O$
  35 lbs. sulfuric × 7% $H_2O$ = 2.45 lbs. $H_2O$
235 lbs = charge weight
              Total Formula = 27.45 lbs $H_2O$
              $H_2O$ content.
Water added to above formula is,         24 lbs.
Water present in above formula is        27.45 lbs.
Total $H_2O$ present and added           51.45 lbs.

Total water present = $\frac{27.45}{235} \times 100 = 10.2\%$ in formula.

Total water from all sources = $\frac{51.45}{235} \times 100 = 22.0\%$

---

Some of the 22% of $H_2O$ is being evaporated during the admixing operation. Thus as much as about 12% of the weight of charge must be added to maintain fluid conditions in the mixer.

Amounts of water are readily regulated by flow meters in a standard manner. The condition of the mix is controlled by (set-up time after discharge) water addition as necessary or desirable to maintain the fluid conditions desired as determined by the operator.

Thus, for example, in initial experiments using the pug mill, dryer, coller, etc. water was added at the discharge end of the first heating stage in amounts up to 50% by weight of the charge in order to rapidly reduce temperature and help maintain product water solubility and degree of hydration.

Because of cost factors, I now prefer to add water in the cooler inlet, replacing water which had been added in the first heater and additional amount (small quantity) in 2nd heater. Thus, I now prefer to add water at the point of reaction between acids and rock and the point of mixing of slurry and recycle and finally at the cooler inlet (a total of three points).

Essentially, in addition to adding water at the initial admixing stage in the tank reactor, water can be added at any subsequent stage of the process to maintain fluid conditions and to achieve the desired water of hydration and it is for this reason that the flow diagram shows water inlets at each stage of the heating cycle.

It should be pointed out that as long as there is a changing $H_2O$ condition we have a system which is constantly going back and forth in a reversible reaction as $CaH_4(PO_4)_2 + H_2O \rightleftharpoons CaH_4(PO_4)_2 \cdot H_2O$ and $CaHPO_4 + 2H_2O \rightleftharpoons CaHPO_4 \cdot 2H_2O)$.

The purpose for adding water in the tank reactor (1) is for increasing liquid phase in order to complete the reactions; to achieve low citrate insolubility; to provide sufficient water to hydrate mono- and dicalcium phosphates and to obtain a high degree of water soluble $P_2O_5$.

Water may also be added at the discharge end of the mixer (pug mill) where recycle and slurry are mixed in order to adequately blend the recycle and slurry. Both water additions also serve to maintain water solubility and hydration of phosphate compounds (monocalcium phosphate and dicalcium phosphate, etc.).

Addition of $H_2O$ in the cooler inlet (5) is to rapidly drop the temperature of product to less than 300° F. as quickly as possible and also to insure water of hydration in the 4% by weight of product range.

My objective is to produce a product which is about 4% hydrated (calcium phosphates) which means that the phosphate compounds are about 40-50% hydrated since 100% hydration represents approximately 8-10% by weight of hydration water.

Free water content of the product should not exceed about 2-3% by weight to insure satisfactory physical properties and preferably about 1% or less. This limitation restricts the amount of water in the final stage.

Recyle Addition

Recycle, which is normally produced in any closely sized granulation product is present in the system chiefly as fines reject from the process. Thus the fines are returned to the system for agglomeration and sizing before it can become product. Recycle also serves a very important purpose as a liquid phase control agent and this is very important in the granulation process particularly since it is the most economical and simplest way to condition the reactor slurry discharge product so that it can be further mixed, dried, cooled and sized. This is very important in the carrying out of the process. When previously provided Superphosphate is the main feed stock to the granulation and fluoride removal systems less recycle is required (about $\frac{1}{2}$-1) to (2-1) by weight of product. This makes possible higher product rates in the granulation-defluorination unit because of significant decrease in recycle rates.

Heating

In the example I have used a counter current first heater stage and a co-current second heater stage, but this is preferable rather than required and is more related to plant layout rather than anything else.

Cooling

Cooling is preferably done in the pilot plant in a rotary cooler (5) with relatively small amounts of air compared to commercial rotary coolers which required about 15,000 to 25,000 cubic feet per minute of ambient air. I prefer to use about half of this amount; however, we are initially cooling the product from about 400°-500° F. to 300° F. or lower as it enters the rotary cooler—this is very rapid cooling. Cooling after water addition takes place in about 4 to 8 minutes and reaches temperatures of 150° F. and lower. Water and air can be used simultaneously to achieve cooling.

Neutralization

Neutralization agents are calcium oxide, calcium carbonate, calcium hydroxide, sodium carbonate, sodium hydroxide or potassium hydroxide or ammonia. My preferred reagent is calcium oxide or calcium hydroxide. These materials may be added in the cooler (5) inlet or added to product only as it goes to storage in a suitable mixer. I have used both procedures in the pilot plant by spraying a slurry of CaO in the inlet end of the cooler and batch mixing the product in a cement mixer (5 cu. ft.) before storing.

Diatomaceous Earth Additions

Diatomaceous earth has, at best, caused only minor improvements in fluorine evolution when Florida rock is used. The data has been somewhat ambiguous; however, it is common knowledge that rocks which contain less than about 2% $SiO_2$ must have a source of Si added. This is because the desirable gaseous compound in fluoride evolution is $H_2SiF_6$ and $SiF_4$. Commercial grade Florida rocks generally contain more than 2% $SiO_2$. High grade rocks from Florida deposits are becoming less and less and the lower grade rocks contain high $SiO_2$.

Weight loss at 103°0 C. for four hours represents free moisture or water. If the time is continued such as 24 hours no additional weight loss is experienced for my products.

Weight loss at 245° C. for $1\frac{1}{2}$ hours represents not only, loss of free water but also loss of water of hydration. Some nutritionists want the dicalcium phosphate portion of product to be in the hydrated form and for this reason I have made this a requirement of my product in requiring that about 40% of the product be in the hydrated form. This insures that the dicalcium phosphate portion of my product is in the hydrated form. This is a procedure which is unique to my product and since my product differs significantly from other commercial products, it is a specification which I have required.

Simply by observation alone, I have arrived at the fact that when the slurry reactor discharge product is very high in water soluble $P_2O_5$ (frequently 98 to 99%); low (less than 0.25% C.I. $P_2O_5$); and contains a difference in 103° C. oven and 245° C. of between 5 and 9% then defluorination occurs under less stringent conditions such as a max. heater temperature of 425°-450° F. instead of 500°-550° F. This can amount to difference in F of about 0.03% F to 0.05% F. Furthermore, higher water soluble $P_2O_5$ values (usually about 2 to 5% $P_2O_5$) result.

ABBREVIATIONS AND ANALYTICAL METHODS

In the following examples the abbreviations and analytical methods used are as follows:

TP = Total Phosphate, as $P_2O_5$
TPA = Same as TP
WSP = Water Soluble Phosphate, as $P_2O_5$
WSPA = Same as WSP
IPA = Insoluble $P_2O_5$ via neutral ammonium citrate method.
CPA = Same as IPA All of above determinations were by "Official Methods of Analysis of the Association of Official Analytical Chemists, 13th Addition."

The following items were by the "General Analytical Laboratory Manual", Division of Chemical Development, TVA, Muscle Shoals, Alabama 35660.

| | |
|---|---|
| F | Fluorine |
| Ca & CaO | Calcium and Calcium Oxide |
| $CO_2$ | Carbon Dioxide |
| $H_3PO_4$ | Wet Process phosphoric Acid |
| S | Sulfur |
| FA | Free Acid usually expressed as $H_3PO_4$ but sometimes expressed as $H_2SO_4$ when noted. |
| Free Moisture: | 5 gram sample dried in OVEN at 103° C. |

-continued for four (4) hours.

% Free H$_2$O = $\frac{\text{Weight loss of sample}}{\text{Sample Weight}} \times 100$ Approximate % of
Hydration:    5 gram sample dried in oven
              @ 245° C. for 1.5 hours.

Weight Loss at = $\frac{\text{Weight loss of sample}}{\text{sample weight}} \times 100$ Approximate % of
Hydration =   % Weight loss at 245° C.-
              % Free Moisture.

I have continued to speak of free acid as H$_3$PO$_4$, although the formula contains a significant amount of H$_2$SO$_4$. Superphosphates manufactured with part or all of the acidulant form H$_2$SO$_4$ will contain free acid chiefly as H$_3$PO$_4$ because of the following chemical reactions:

(1)  3Ca$_3$(PO$_4$)$_2$·CaF$_2$+7H$_2$SO$_4$→3CaH$_4$(PO$_4$)$_2$+ 7CaSO$_4$+2HF.

(2)  3CaH$_4$(PO$_4$)$_2$+7CaSO$_4$+3H$_2$SO$_4$→(6H$_3$PO$_4$)+10CaSO$_4$.

Thus free H$_2$SO$_4$ will not be present in superphosphates because it would be impossible to approach this degree of acidulation and have a desirable product. Actually, this is the chemistry for producing wet process H$_3$PO$_4$. The insoluble CaSO$_4$ from the above equations is filtered from the resulting slurry and the remaining H$_3$PO$_4$ then concentrated to desired grades.

EXAMPLE CLASSIFICATION

A. Feed

The charge in the feed is in pounds and the percent composition of the charge is shown.

B. Rock Grind in Examples

The rock grind in all the following examples 1 to 8 was 73–75% minus 200 mesh (U.S. Standard)

C. Acid used

The actual acids used in the examples was as shown in the percent chart at the beginning of each example, which is percent by weight.

EXAMPLE I

1. Feed (Charge)

| | P$_2$O$_5$ % | CaO | F | CO$_2$ | H$_2$SO$_4$ |
|---|---|---|---|---|---|
| 100 Rock | 31.2 | 47.6 | 3.20 | 3.15 | — |
| 100 H$_3$PO$_4$ | 54.0 | — | 0.60 | — | — |
| 34 H$_2$SO$_4$ | — | — | — | — | 93.0% |
| 234 lbs. charge weight | | | | | |

2. Mixer
   Retention time      4.0 minutes
   H$_2$O added         10–20 lbs./hr.
   Temperature         225° F.
3. 1st Stage Heater
   Retention time      4–6 minutes
   No H$_2$O added
   Temperature         380° F.
4. 2nd Stage Heater
   Retention time      4–5 minutes
   No H$_2$O added
   Temperature         450° F.
5. Cooler
   Retention time      4–5 minutes
   H$_2$O added         35–60 lbs./hr. (cooler inlet)
   Temperature         170°–190° F.

EXAMPLE I-continued

6. Product Temperature    100°–120° F.

| | ANALYSIS | | | | | OVENS | |
|---|---|---|---|---|---|---|---|
| | F | TPA | IPA | WSPA | FA | 103° C. | 245° C. |
| Mixer | 1.20 | 31.51 | .75 | 28.18 | 14.59 | 21.5 | 27.5 |
| 1st Stage Heater | 0.30 | 40.66 | 1.45 | 25.68 | 3.59 | 0.0 | 0.70 |
| 2nd Stage Heater | 0.20 | 40.39 | 1.36 | 27.41 | 6.00 | 0.0 | 0.95 |
| Cooler | 0.21 | 40.85 | 1.39 | 27.58 | 6.18 | 0.0 | 1.24 |
| Product | 0.18 | 41.02 | 1.35 | 28.80 | 6.20 | 0.0 | 1.80 |

EXAMPLE II

1. Feed (Charge)

| | (Percent) | | | | |
|---|---|---|---|---|---|
| | P$_2$O$_5$ | CaO | F | CO$_2$ | H$_2$SO$_4$ |
| 100 Rock | 31.2 | 47.6 | 3.20 | 3.15 | — |
| 100 H$_3$PO$_4$ | 54.0 | — | 0.60 | — | — |
| 34 H$_2$SO$_4$ | — | — | — | — | 93.0% |
| 234 lbs. charge weight | | | | | |

2. Mixer
   Retention time      4.0 minutes
   H$_2$O added         15–30 lbs./hr.
   Temperature         220° F.
3. 1st Stage Heater
   Retention time      4–6 minutes
   No H$_2$O added
   Temperature         350°–380° F.
4. 2nd Stage Heater
   Retention time      4–5 minutes
   No H$_2$O added
   Temperature         400°–495° F.
5. Cooler
   Retention Time      4–5 minutes
   H$_2$O added         30–60 lbs./hr.
   Temperature         150°–165° F.
6. Product Temperature  100° F.

| | ANALYSIS | | | | | OVENS | |
|---|---|---|---|---|---|---|---|
| | F | TPA | IPA | WSPA | FA | 103° C. | 245° C. |
| Mixer | 1.00 | 30.00 | .09 | 28.33 | 17.01 | 22.2 | 30.8 |
| 1st Stage Heater | .28 | 40.86 | .83 | 24.53 | 8.22 | 0.0 | 2.15 |
| 2nd Stage Heater | .23 | 40.44 | .89 | 29.49 | 9.89 | 0.0 | 1.00 |
| Cooler | .22 | 40.63 | .98 | 28.36 | 10.02 | 0.0 | 1.50 |
| Product | .20 | 40.30 | .76 | 28.15 | 10.02 | 0.45 | 2.48 |

EXAMPLE III

1. Feed (Charge)

| | (Percent) | | | | |
|---|---|---|---|---|---|
| | P$_2$O$_5$ | CaO | F | CO$_2$ | H$_2$SO$_4$ |
| 100 Rock | 31.2 | 47.6 | 3.20 | 3.15 | — |
| 100 H$_2$PO$_4$ | 54.0 | — | 0.60 | — | — |
| 34 H$_2$SO$_4$ | — | — | — | — | 93.0% |
| 234 lbs. charge weight | | | | | |

2. Mixer
   Retention time      4.0 minutes
   H$_2$O added         20–30 lbs.
   Temperature         225°–235° F.
3. 1st Stage Heater
   Retention time      4–6 minutes
   No H$_2$O added
   Temperature         380° F.
4. 2nd Stage Heater
   Retention time      4–5 minutes
   No H$_2$O added
   Temperature         495–520° F.
5. Cooler
   Retention time      4–5 minutes
   H$_2$O added         30–60 lbs./hr.
   Temperature         135° F.
6. Product Temperature  100° F.

| | ANALYSIS | | | | | OVEN | |
|---|---|---|---|---|---|---|---|
| | F | TPA | IPA | WSPA | FA | 103° C. | 245° C. |

EXAMPLE III-continued

| | | | | | | | |
|---|---|---|---|---|---|---|---|
| Mixer | 1.05 | 30.8 | 0.15 | 29.5 | 15.58 | 22.8 | 30.1 |
| 1st Stage Heater | 0.26 | 41.68 | 0.84 | 24.52 | 3.60 | 0.0 | 2.40 |
| 2nd Stage Heater | 0.20 | 41.71 | 1.15 | 23.53 | 4.15 | 0.0 | 1.60 |
| Cooler | 0.20 | 41.45 | 0.90 | 24.60 | 6.00 | 0.0 | 2.95 |
| Product | 0.18 | 41.40 | 0.95 | 26.30 | 6.40 | 0.0 | 3.10 |

EXAMPLE IV

| | (Percent) | | | | |
|---|---|---|---|---|---|
| 1. Feed (Charge) | $P_2O_5$ | CaO | F | $CO_2$ | $H_2SO$ |
| 100 Rock | 31.2 | 47.6 | 3.20 | 3.15 | — |
| 100 $H_3PO_4$ | 54.0 | — | 0.60 | — | — |
| 34 $H_2SO_4$ | — | — | — | — | 93.0% |
| 234 lbs. charge weight | | | | | |

2. Mixer
   Retention time 4.0 minutes
   $H_2O$ added 25–30 lbs./hr.
   Temperature 220°–230° F.
3. 1st Stage Heater
   Retention time 4–6 minutes
   No $H_2O$ added
   Temperature 350°–375° F.
4. 2nd Stage Heater
   Retention time 4–5 minutes
   No $H_2O$ added
   Temperature 390°–450° F.
5. Cooler
   Retention time 4–5 minutes
   $H_2O$ added 30–60 lbs./hr.
   Temperature 135–140° F.
6. Product Temperature 85° F.

| | ANALYSIS | | | | OVENS | |
|---|---|---|---|---|---|---|
| | F | TPA | IPA | WSPA | FA | 103° C. | 245° C. |
| Mixer | 1.10 | 32.96 | 0.00 | 32.33 | 17.31 | 21.95 | 29.13 |
| 1st Stage Heater | 0.27 | 44.19 | 1.36 | 28.80 | 8.77 | 0.00 | 3.09 |
| 2nd Stage Heater | 0.23 | 44.18 | 1.28 | 29.95 | 7.85 | 0.00 | 1.87 |
| Cooler | 0.24 | 43.86 | 1.20 | 29.75 | 7.54 | 1.73 | 4.04 |
| Product | 0.22 | 43.34 | 1.01 | 20.75 | 7.30 | 1.56 | 3.90 |

EXAMPLE V

| | (Percent) | | | | |
|---|---|---|---|---|---|
| 1. Feed (Charge) | $P_2O_5$ | CaO | F | $CO_2$ | $H_2SO_4$ |
| 100 Rock | 31.0 | 47.2 | 3.20 | 3.20 | — |
| 112 $H_3PO_4$ | 55.0 | — | 0.23 | — | — |
| 33 $H_2SO_4$ | — | — | — | — | 93.0% |
| 245 lbs. charge weight | | | | | |

2. Mixer
   Retention time 4 minutes
   $H_2O$ added 10–20 lbs./hr.
   Temperature 225°–228° F.
3. 1st Stage Heater
   Retention time 4–6 minutes
   No $H_2O$ added
   Temperature 350°–363° F.
4. 2nd Stage Heater
   Retention time 4–5 minutes
   No $H_2O$ added
   Temperature 425°–475° F.
5. Cooler
   Retention time 4–5 minutes
   $H_2O$ added 30–40 lbs./hr.
   Temperature 150°–160° F.
6. Product Temperature 120° F.

| | ANALYSIS | | | | OVENS | |
|---|---|---|---|---|---|---|
| | F | TPA | IPA | WSPA | FA | 103° C. | 245° C. |
| Mixer | 0.70 | 32.41 | — | — | 23.25 | 23.75 | 32.12 |
| 1st Stage Heater | 0.21 | 44.54 | 1.47 | 28.31 | 11.94 | 0.00 | 1.85 |
| 2nd Stage Heater | 0.17 | 45.25 | 1.49 | 26.84 | 10.10 | 0.00 | 1.05 |
| Cooler | 0.17 | 45.04 | 1.52 | 28.95 | 10.05 | 0.00 | 2.98 |

EXAMPLE V-continued

| Product | 0.18 | 44.60 | 1.56 | 29.37 | 9.65 | 0.00 | 2.39 |
|---|---|---|---|---|---|---|---|

EXAMPLE VI

| | (Percent) | | | | |
|---|---|---|---|---|---|
| 1. Feed (Charge) | $P_2O_5$ | CaO | F | $CO_2$ | $H_2SO_4$ |
| 100 Rock | 31.0 | 47.2 | 3.20 | 3.20 | — |
| 112 $H_3PO_4$ | 55.2 | — | 0.23 | — | — |
| 33 $H_2SO_4$ | — | — | — | — | 93.0% |
| 245 lbs. charge weight | | | | | |

2. Mixer
   Retention time 2.5 minutes
   $H_2O$ added 10–20 lbs./hr.
   Temperature 245° F.
3. 1st Stage Heater
   Retention time 4–6 minutes
   No $H_2O$ added
   Temperature 360°–400° F.
4. 2nd Stage Heater
   Retention time 4–5 minutes
   No $H_2O$ added
   Temperature 460°–530° F.
5. Cooler
   Retention time 4–5 minutes
   $H_2O$ added 15–30 lbs./hr.
   Temperature 200°–235° F.
6. Product Temperature 140° F.

| | ANALYSIS | | | | OVENS | |
|---|---|---|---|---|---|---|
| | F | TPA | IPA | WSPA | FA | 103° C. | 245° C. |
| Mixer | .86 | 35.76 | — | — | 18.55 | 15.8 | 25.4 |
| 1st Stage Heater | .35 | 44.87 | 1.70 | 31.83 | 10.82 | .79 | 3.54 |
| 2nd Stage Heater | .23 | 44.92 | 2.20 | 29.70 | 8.04 | 0.0 | 3.50 |
| Cooler | .22 | — | — | — | — | — | — |
| Product | .20 | 43.60 | 1.88 | 30.50 | 8.22 | 0.35 | 5.36 |

EXAMPLE VII

| | (Percent) | | | | |
|---|---|---|---|---|---|
| 1. Feed (Charge) | $P_2O_5$ | CaO | F | $CO_2$ | $H_2SO_4$ |
| 100 Rock | 31.2 | 47.6 | 3.2 | 3.15 | — |
| 105 $H_3PO_4$ | 54.0 | — | 0.23 | — | — |
| 34 $H_2SO_4$ | — | — | — | — | 93.0% |
| 239 lbs. charge weight | | | | | |

2. Mixer
   Retention time 2.5 minutes
   $H_2O$ added 10–20 lbs./hr.
   Temperature 235° F.
3. 1st Stage Heater
   Retention time 4–6 minutes
   No $H_2O$ added
   Temperature 400° F.
4. 2nd Stage Heater
   Retention time 5–6 minutes
   No $H_2O$ added
   Temperature 450° F.
5. Cooler
   Retention time 4–5 minutes
   $H_2O$ added 30–45 lbs.
   Temperature 130° F.

| | ANALYSIS | | | | OVENS | |
|---|---|---|---|---|---|---|
| | F | TPA | IPA | WSPA | FA | 103° C. | 245° C. |
| Mixer | — | — | — | — | — | — | — |
| 1st Stage Heater | — | — | — | — | — | — | — |
| 2nd Stage Heater | — | — | — | — | — | — | — |
| Product | 0.13 | 43.51 | 1.71 | 26.34 | 8.38 | 1.95 | 3.04 |

EXAMPLE VIII

| | (Percent) | | | | |
|---|---|---|---|---|---|
| 1. Feed (Charge) | $P_2O_5$ | CaO | F | $CO_2$ | $H_2SO_4$ |

EXAMPLE VIII-continued

| | | | | | |
|---|---|---|---|---|---|
| 100 Rock | 31.2 | 47.6 | 3.2 | 3.15 | — |
| 105 H₃PO₄ | 54.0 | — | 0.23 | — | — |
| 34 H₂SO₄ | — | — | — | — | 93.0% |
| 239 lbs. charge weight | | | | | |

2. Mixer
   Retention time 2.5 minutes
   H₂O added 15-25 lbs./hr.
   Temperature 240° F.
3. 1st Stage Heater
   Retention time 5-6 minutes
   No H₂O added
   Temperature 375° F.
4. 2nd Stage Heater
   Retention time 5-6 minutes
   No H₂O added
   Temperature 500° F.
5. Cooler
   Retention time 4-5 minutes
   H₂O added 20-40 lbs.
   Temperature 135° F.

ANALYSIS %

| | F | TPA | IPA | WSPA | FA | 103° C. | 245° C. |
|---|---|---|---|---|---|---|---|
| Mixer | 0.86 | 36.36 | — | — | 18.18 | 17.02 | 25.32 |
| 1st Stage Heater | 0.21 | — | — | — | 11.07 | — | — |
| 2nd Stage Heater | 0.16 | — | — | — | 9.28 | — | — |
| Cooler | — | — | — | — | — | — | — |
| Product | 0.15 | 45.75 | 1.36 | 29.30 | 10.51 | 1.44 | 6.97 |

I claim:

1. A method for removing fluorine from natural phosphates, Superphosphate materials and wet process phosphoric acids starting materials comprising
   (a) admixing rock phosphate having a fluorine content above that desired with an acid mixture within the range of rock:acid mixture of about 0.8 to 1 and 1:1.4 by weight;
   (b) said acid mixture being substantially concentrated phosphoric acid and concentrated sulfuric acid in a range of phosphoric:sulfuric of about 1:1 to 5:1 by weight;
   (c) said admixing being at a temperature in the range of 215° to 265° F. while adding water in an amount of up to about 12% by weight of the total mixture and then subjecting the above charge;
   (d) in a first heating stage adding (1) recycle in an amount substantially of recycle to charge of 1:1 to 10:1 by weight (2) and water while heating to a temperature in the range of 300° F. to 400° F. for a period of time up to about 6 minutes;
   (e) and in a second heating stage, maintaining the temperature in the range of 400° to 600° F. for a period of time of up to about 6 minutes, and then;
   (f) quickly cooling the resulting product above to a temperature range below about 300° to 200° F. while neutralizing to about 1 to 6% free acid and with addition of at least sufficient amount of water to have water of hydration of substantially 2 to 9% by weight in the final product;
   (g) and, crushing the above resulting product to a desired granular size and separating and returning smaller fine particles as recycle.

2. A method according to claim 1, wherein said fluorine content of said starting material is in the range of about 0.5 to 2.5% by weight.

3. A method according to claim 1, wherein said sulfuric acid is 93 to 100%+by weight of sulfuric acid.

4. A method according to claim 3, wherein said phosphoric acid is commercial wet process phosphoric acid of about 46 to 60% by weight phosphoric acid as P₂O₅.

5. A method according to claim 4, wherein said ratio of acid to phosphate rock is chosen to get a final product before neutralization in said step (f) of about 2 to 8% by weight of free acid.

6. A method according to claim 5, wherein said temperature range in said first heating stage is about 375° to 425° F.

7. A method according to claim 6, wherein said temperature range in said second heating stage is in the range of 425° to 600° F.

* * * * *